(12) United States Patent
Marcinkevicius et al.

(10) Patent No.: US 8,023,538 B2
(45) Date of Patent: Sep. 20, 2011

(54) ULTRA-HIGH POWER PARAMETRIC AMPLIFIER SYSTEM AT HIGH REPETITION RATES

(75) Inventors: Andrius Marcinkevicius, Ann Arbor, MI (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 367 days.

(21) Appl. No.: 12/411,334

(22) Filed: Mar. 25, 2009

(65) Prior Publication Data
US 2009/0244695 A1    Oct. 1, 2009

Related U.S. Application Data

(60) Provisional application No. 61/040,047, filed on Mar. 27, 2008, provisional application No. 61/053,375, filed on May 15, 2008.

(51) Int. Cl.
*H01S 4/00* (2006.01)
*H04B 10/17* (2006.01)
*G02F 1/39* (2006.01)

(52) U.S. Cl. .................. 372/25; 359/330; 359/341.1

(58) Field of Classification Search ............ 359/330, 359/341.1; 372/25
See application file for complete search history.

(56) References Cited

U.S. PATENT DOCUMENTS

| | | |
|---|---|---|
| 5,499,134 A | 3/1996 | Galvanauskas et al. |
| 5,627,848 A | 5/1997 | Fermann et al. |
| 5,666,373 A | 9/1997 | Sharp et al. |
| 5,815,307 A | 9/1998 | Arbore et al. |
| 5,818,630 A | 10/1998 | Fermann et al. |
| 5,847,863 A | 12/1998 | Galvanauskas et al. |
| 5,862,287 A | 1/1999 | Stock et al. |
| 5,867,304 A | 2/1999 | Galvanauskas et al. |
| 5,880,877 A | 3/1999 | Fermann et al. |
| 6,014,249 A | 1/2000 | Fermann et al. |
| 6,181,463 B1 | 1/2001 | Galvanauskas |

(Continued)

FOREIGN PATENT DOCUMENTS
EP    1724634 A1    11/2006
(Continued)

OTHER PUBLICATIONS

Abdolvand, et al., *Ultra-efficient Ho: YAG laser end-pumped by a cladding-pumped Tm-doped silica fiber laser*, ASSP 2003, OSA TOPS, vol. 83, pp. 7-12.

(Continued)

*Primary Examiner* — Eric Bolda
(74) *Attorney, Agent, or Firm* — Knobbe, Martens, Olson & Bear, LLP (57) ABSTRACT

Embodiments of parametric chirped pulse amplifiers seeded with a single pulse source which is subsequently split into a signal arm and a pump arm with appropriate signal and pump conditioning stages are disclosed, which advantageously improve the utility of high average power and/or high energy ultrafast amplification systems. In various embodiments, at least one of the signal or the pump conditioning stages is non-linear, allowing for a great range of seed sources to be utilized. Chirped pulse amplification in the pump conditioning stage may be used to simplify the parametric amplification of pulses with pulse widths of the order of 10 fs. The parametric pump can include coherently combined fiber arrays, hybrid fiber solid-state amplifiers, and/or cryogenically cooled solid-state amplifiers to increase or optimize the energy extraction of high average powers.

29 Claims, 6 Drawing Sheets

U.S. PATENT DOCUMENTS

| | | | |
|---|---|---|---|
| 6,195,372 | B1 | 2/2001 | Brown |
| 6,198,568 | B1 | 3/2001 | Galvanauskas et al. |
| 6,208,458 | B1 | 3/2001 | Galvanauskas |
| 6,272,156 | B1 | 8/2001 | Reed et al. |
| 6,359,914 | B1 | 3/2002 | Powers et al. |
| 6,728,273 | B2 | 4/2004 | Perry |
| 6,804,287 | B2 | 10/2004 | Backus |
| 6,870,664 | B2 | 3/2005 | Jovanic |
| 7,088,756 | B2 | 8/2006 | Fermann |
| 7,257,302 | B2 | 8/2007 | Fermann |
| 7,394,591 | B2 | 7/2008 | Harter |
| 2002/0001321 | A1* | 1/2002 | Perry .............................. 372/22 |
| 2004/0057682 | A1 | 3/2004 | Nicholson et al. |
| 2004/0213302 | A1 | 10/2004 | Fermann et al. |
| 2004/0263950 | A1 | 12/2004 | Fermann et al. |
| 2005/0018714 | A1 | 1/2005 | Fermann et al. |
| 2005/0157760 | A1 | 7/2005 | Rice |
| 2005/0232318 | A1 | 10/2005 | Kawanaka |
| 2005/0238070 | A1 | 10/2005 | Imeshev |
| 2005/0271094 | A1 | 12/2005 | Miller |
| 2007/0086713 | A1 | 4/2007 | Ingmar |
| 2007/0297469 | A1 | 12/2007 | Brown |
| 2009/0201575 | A1 | 8/2009 | Fermann et al. |

FOREIGN PATENT DOCUMENTS

| | | |
|---|---|---|
| WO | WO 2004/000163 | 12/2003 |
| WO | WO 2005/017955 | 2/2005 |

OTHER PUBLICATIONS

G. Arisholm et al., "Limits to the power scalability of high-gain optical parametric amplifiers", J. Opt. Soc. Am. B, vol. 21, No. 3, pp. 578-590, Mar. 2004.

Baltušaka, et al., *Visible pulse compression to a 4 fs by optical parametric amplification and programmable dispersion control*, Opt. Lett. 27, vol. 27, No. 5, Mar. 1, 2002, pp. 306-308.

G.P. Banfi et al., "Travelling-wave parametric conversion of microjoule pulses with LBO", Optics Communications, vol. 118, pp. 353-359, Jul. 1995.

R.A. Baumgartner et al., "Optical Parametric Amplification", IEEE J. Quant. Elec, vol. QE-15, No. 6, pp. 432-444, Jun. 1979.

Byer et al., "Optical Parametric Oscillation and Amplification" Feature Issue Editors- Byer/ Piskarskas, J. Opt. Soc. Am. B, vol. 10, No. 11, pp. 2148-2148, Nov. 1993.

G. Cerullo et al., "Sub-8-fs pulses from an ultrabroadband optical parametric amplifier in the visible", Optics Letters, vol. 23, No. 16, pp. 1283-1285, Aug. 1998.

Chen, et al., *Characterization of Two-photon excitation Fluorescence Lifetime Imaging Microscopy for Protein Localization*, Microscopy Research and Technique, 63, pp. 72-80 (2004).

Dawson, et al., *Scalable 11W 938nm $Nd^{3+}$ doped fiber laser*, ASSP 2004, paper MD8.

R.C. Eckardt et al., "Optical parametric oscillator frequency tuning and control: errata"; J. Opt. Soc. Am. B, vol. 12, No. 11, p. 2322, Nov. 1995.

R.C. Eckardt et al., "Optical parametric oscillator frequency tuning and control", J. Opt. Soc. Am. B, vol. 8, No. 3, pp. 646-667, Mar. 1991.

Eimerl, *Quadrature Frequency Conversion*, IEEE Journal of Quantum Electronics, vol. QE-23, No. 8, 1987, pp. 1361-1371.

El-Sherif, et al., *Analysis and Optimization of Q-Switched Operation of a $Tm^{3+}$-Doped Silica Fiber Laser Operating at 2µm*, IEEE Journal of Quantum Electronics, vol. 39, No. 6, Jun. 2003, pp. 759-765.

K. Finsterbusch, et al., "Tunable, high-power, narrow-band picosecond IR radiation by optical parametric amplification in KTP", Applied Physics B 74, pp. 319-322, Mar. 13, 2002.

Gale, et al., *Sub-20-fs tunable pulses in the visible from an 82-MHz optical parametric oscillator*, Optics Letters, vol. 20, No. 14, Jul. 15, 1995, pp. 1562-1564.

Galvanauskas, et al, *Fiber-laser-based femtosecond parametric generator in bulk periodically poled $LiNbO_3$*, Optics Letters, vol. 22, No. 2, Jan. 15, 1997, pp. 105-107.

A.Galvanauskas et al., "High-energy femtosecond pulse amplification in a quasi-phase-matched parametric amplifier", Optics Letters, vol. 23, No. 3, pp. 210-212, Feb. 1998.

Goldberg, et al., *Highly efficient 4-W Yb-doped fiber amplifier pumped by a broad-stripe laser diode*, Optics Letters, vol. 24, No. 10, May 15, 1999, pp. 673-675.

Gomes, et al., *Low-pump-power, short-fiber copropagating dual-pumped (800 and 1050 nm) thulium-doped fiber amplifier*, Optics Letters, vol. 28, No. 5, Mar. 1, 2003, pp. 334-336.

Guerreiro, et al., *PbS quantum-dot doped glasses as saturable absorbers for mode locking of a Cr:forsterite laser*, Appl. Phys. Lett. 71 (12), Sep. 12, 1997, pp. 1595-1597.

Hori, et al., *Flatly broadened, wideband and low noise supercontinuum generation in highly nonlinear hybrid fiber*, Optics Express 317, vol. 12, No. 2, Jan. 26, 2004, pp. 317-324.

Hugonnot, et al., *Amplified femtosecond laser system based on continuum generation and chirped pulse parametric amplification*, Advanced Solid-State Photonics, 2004, paper MC3.

Imeshev, et al., *Ultrashort-pulse second-harmonic generation with longitudinally nonuniform quasi-phase-matching gratings: pulse compression and shaping*, Optical Society of America, vol. 17, No. 2, Feb. 2000, pp. 304-318.

Imeshev, et al., *Ultrashort-pulse second-harmonic generation with longitudinally nonuniform quasi-phase-matching gratings: pulse compression and shaping*, Optical Society of America, 2001, ERRATA.

E. Innerhofer et al. "Analysis of nonlinear wavelength conversion system for a red-green-blue laser-projection source", J. Opt. Soc. Am. B, vol. 23, No. 2, pp. 265-275, Feb. 2006.

Stuart D. Jackson, *Cross relaxation and energy transfer upconversion processes relevant to the functioning of 2 µm $Tm^{3+}$-doped silica fibre lasers*, Optics Communications 230 (2004), pp. 197-203.

Kane, et al., *3-Watt blue source based on 914-nm $Nd:YVO_4$ passively-Q-switched laser amplified in cladding-pumped Nd:fiber*, ASSP 2004, paper MD7.

Kasamatsu, et al., *1.49-µm Band Gain-Shifted Thulium-Doped Fiber Amplifier for WDM Transmission Systems*, Journal of Lightwave Technology, vol. 20, No. 10, Oct. 2002, pp. 1826-1837.

Klein, et al., *Rapid infrared wavelength access with a picosecond PPLN OPO synchronously pumped by a mode-locked diode laser*, Appl. Phys. B 73, 2001, pp. 1-10.

B. Kohler et al. "A 9.5-W 82-MHz-repetition-rate picosecond optical parametric generator with cw diode laser injection seeding", Applied Physics B, vol. 75, pp. 31-34, published online in Aug. 2002.

S.V. Marchese et al. "Room temperature femtosecond optical parametric generation in MgO-doped stoichiometric LiTaO3", Applied Physics B: Lasers and Optics vol. 81, pp. 1049-1052, published online Nov. 2005.

Myers, et al., *Quasi-phase-matched optical parametric oscillators in bulk periodically poled $LiNbO_3$*, J. Opt. Soc. Am. B, vol. 12, No. 11, Nov. 1995, pp. 2102-2116.

Nelson, et al., *Broadly tunable sub-500 fs pulses from an additive-pulse mode-locked thulium-doped fiber ring laser*, Appl. Phy. Lett. 67, vol. 67, 1995, pp. 19-21.

"Optical Parametric Generators (OPG)" Encyclopedia of Laser Physics and Technology, available on the website http://www.rp-photonics.com/optical_parametric_amplifiers.html at least until Jan. 19, 2009.

"Optical Parametric Amplifiers (OPA)", Encyclopedia of Laser Physics and Technology, available on the website http://www.rp-photonics.com/optical_parametric_amplifiers.html at least until Jan. 21, 2009.

Ouzounov, et al., *Generation of Megawatt Optical Solitons in Hollow-Core Photonic Band-Gap Fibers*, Science 301, 1702, 2003, pp. 1702-1704.

A. Piskarskas et al. "Optical parametric generators: tunable, powerful, ultrafast:", Opt. Photonics News, pp. 25-28 and 55, Jul. 1997.

Powers, et al., *Continuous tuning of a continuous-wave periodically poled lithium niobate optical parametric oscillator by use of a fan-out grating design*, Optics Letters, vol. 23, No. 3, Feb. 1, 1998, pp. 159-161.

M. Reed et al. "Microjoule-energy ultrafast optical parametric amplifiers", J. Opt. Soc. Am. B vol. 12, No. 11, pp. 2229-2236, Nov. 1995.

Schober, et al., *Tunable-chirp pulse compression in quasi-phase-matched second-harmonic generation*, Optics Letters, vol. 27, No. 13, Jul. 1, 2002, pp. 1129-1131.

A. Shirakawa et al. "Sub-5-fs visible pulse generation by pulse-front-matched noncollinear optical parametric amplification", Applied Physics Letters, vol. 74, No. 16, pp. 2268-2270, Apr. 1999.

Soh, et al., *A Cladding Pumped Neodymium-doped Fiber Laser Tunable From 932 nm to 953 nm*, ASSP 2004, paper MD9.

T Sudmeyer et al. "Novel ultrafast parametric systems: high repetition rate single-pass OPG and fibre-feedback OPO", J. Phys D: Appl. Phys., vol. 34, pp. 2433-2439, Aug. 2001.

Vodopyanov, et al., *Optical parametric oscillation in quasi-phase-matched GaAs*, Optics Letters, vol. 29, No. 16, Aug. 15, 2004, pp. 1912-1914.

Baltuska et al. 'Controlling the Carrier-Envelope Phase of Ultrashort Light Pulses with Optical Parametric Amplifiers', Physical Review Letters, vol. 88, No. 13, pp. 133901-1 to 133901-4, Apr. 1, 2002.

Cerullo et al., 'Ultrafast optical parametric amplifiers', Rev. Scientific Instruments, vol. 74, No. 1, pp. 1-18, Jan. 2003.

Dubietis et al., 'Powerful femtosecond pulse generation by chirped and stretched parametric amplification in BBO crystal', Opt. Comm. vol. 88, pp. 437-440, Apr. 1, 1992.

Erny et al., 'Mid-infrared difference-frequency generation of ultrashort pulses tunable between 3.2 and 4.8 µm', Opt. Lett., vol. 32, No. 9, pp. 1138-1140, May 1, 2007.

Lacovara et al. 'Room temperature diode pumped Yb:YAG laser', Opt. Lett., 16, pp. 1089-1091, Jul. 15, 1991.

Marangoni et al., 'Near-infrared optical parametric amplifier at 1 MHz directly pumped by a femtosecond oscillator', Opt. Lett., vol. 32. pp. 1489-1491, Jun. 1, 2007.

Schriever et al., 'Tunable pulses from below 300 to 970 nm with durations down to 14 fs based on a 2 MHz ytterbium-doped fiber system', Opt. Lett., vol. 33, pp. 192-194, Jan. 15, 2008.

Wilhelm et al., 'Sub-20-fs pulses tunable across the visible from a blue pumped single-pass noncolinear parametric converter', Opt. Lett., vol. 22, No. 19, pp. 1494-1496, Oct. 1, 1997.

Yang et al., 'Multiterawatt laser system based on optical parametric chirped pulse amplification', Opt. Lett., vol. 27, pp. 1135-1137, Jul. 1, 2002.

Fermann, et al., U.S. Appl. No. 12/365,514, filed Feb. 4, 2009, entitled "High Power Parallel Fiber Arrays".

\* cited by examiner

ULTRA-HIGH POWER PARAMETRIC AMPLIFIER SYSTEM AT HIGH REPETITION RATES

CROSS-REFERENCE TO RELATED APPLICATIONS

This application claims the benefit under 35 U.S.C. §119 (e) of U.S. Provisional Patent Application No. 61/040,047, filed Mar. 27, 2008, entitled "ULTRA-HIGH POWER PARAMETRIC AMPLIFIER SYSTEM AT HIGH REPETITION RATES," and U.S. Provisional Patent Application No. 61/053,375, filed May 15, 2008, entitled "ULTRA-HIGH POWER PARAMETRIC AMPLIFIER SYSTEM AT HIGH REPETITION RATES," each of which is hereby incorporated by reference herein in its entirety. This application is related to U.S. patent application Ser. No. 11/091,015, entitled "OPTICAL PARAMETRIC AMPLIFICATION, OPTICAL PARAMETRIC GENERATION, AND OPTICAL PUMPING IN OPTICAL FIBER SYSTEMS," filed Mar. 25, 2005, and published on Oct. 27, 2005 as U.S. Patent Publication No. 2005/0238070, the entire disclosures of the application and publication are hereby incorporated by reference herein in their entirety.

BACKGROUND

1. Field

This application relates to ultra-high peak power laser and amplifier systems and methods.

2. Description of Related Art

Certain embodiments relate to apparatus and methods for amplifying optical pulses from compact laser sources through the use of optical parametric amplifying media. Nonlinear optical elements may be employed to provide amplification in a process known as optical parametric amplification (OPA). In such a process, an intense coherent pump beam at a first wavelength interacts with a nonlinear optical element such as a nonlinear optical crystal to produce amplification. One or more output beams at respective second and third optical wavelengths exit the nonlinear optical element. These output beams are referred to as the signal and the idler. In optical parametric amplification, in addition to being pumped, the nonlinear optical element is seeded with radiation at the signal or the idler wavelengths.

The optical parametric amplification process obeys the conservation of energy principle $\omega_1 = \omega_2 + \omega_3$, where $\omega_1$ is the pump frequency and $\omega_2$ and $\omega_3$ are the signal and idler frequencies, respectively. The individual values of $\omega_2$ and $\omega_3$ also satisfy the conservation of momentum condition, which for plane wave interaction is $k_1 = k_2 + k_3$ where $k_1$, $k_2$, and $k_3$ are the respective wave vectors for $\omega_1$, $\omega_2$, and $\omega_3$. This latter condition provides for phase-matching. Phase matching can be varied by changing an appropriate phase matching parameter of the nonlinear optical element such as the angle of propagation or the crystal temperature.

If no light is supplied to the nonlinear optical element at $\omega_2$ and $\omega_3$, the process is referred to as optical parametric generation (OPG). In OPG, seeding is provided by quantum noise.

When $\omega_2 = \omega_3 = \omega_1/2$, the process is termed degenerate. When the pump wave $\omega_1$ propagates at an angle with respect to the signal wave the amplification process is referred to as noncollinear optical parametric amplification (NOPA).

SUMMARY

Various embodiments relate to the design of compact high average power parametric amplification systems. In one embodiment, a short pulse fiber source is implemented to seed both the signal and the pump arm of the parametric amplifier. Additional signal conditioning stages are provided after the short pulse source to generate an appropriate seed signal for parametric amplification. Also appropriate pump conditioning stages are provided to condition the pump for the parametric amplifier. At least either the signal or the pump conditioning stage is nonlinear. In various embodiments, the parametric amplification system can be configured to provide collinear parametric amplification and/or noncollinear parametric amplification.

Embodiments of a parametric amplifier can be configured to amplify stretched signal pulses. Chirped pulse amplification of the pump pulses can further be implemented to produce short pump pulses of high peak power.

In a first embodiment, a modelocked thulium (Tm) fiber oscillator generates femtosecond pulses in a wavelength range around 2000 nm. For signal conditioning, spectral and temporal broadening of the Tm oscillator pulses is implemented. After parametric amplification, the pulses are compressed back to near their transform limit. The modelocked Tm fiber oscillator is frequency doubled to produce seed pulses for the pump amplifier chain. In some embodiments, the pump amplifier chain is constructed from Yb fiber amplifiers in conjunction with solid-state booster amplifiers. Regenerative solid-state amplifiers as well as single or multi-pass solid-state amplifiers can be used. To increase the peak power of the pump pulses, chirped pulse amplification can be implemented in certain embodiments. In certain such embodiments, a fiber stretcher in conjunction with a bulk grating compressor may be advantageously used. To obtain an optimized beam-quality from the high repetition rate solid-state amplifiers, cryogenic cooling of the active laser crystal can further be implemented in some embodiments. Solid-state amplifiers comprising Yb:KGW, Yb:KYW, Yb:CaF$_2$, Yb:YAG, Yb:BOYS, Yb:CALGO, and/or Yb:SYS can be implemented, just to mention a few examples. The parametric amplifiers can comprise nonlinear crystals including, e.g., PPLN, PPKTP, RTP, RTA, KTA, KDP, BBO, and/or BiBO.

In a second embodiment, the seed pulses are generated using a modified non-collinear optical parametric amplifier (NOPA) architecture based on a short pulse source, two signal conditioning stages and several pump conditioning stages. The first signal conditioning stage can comprise a frequency broadening stage in a highly nonlinear fiber and the second signal conditioning stage can comprise difference frequency mixing. As part of signal conditioning, pulse stretchers can further be implemented. A part of the short pulse source is diverted to seed an amplifier chain for the pump pulses, where solid-state amplifiers can be implemented to generate high pulse energies. The pump pulses can further be conditioned via frequency broadening, anti-Stokes generation in a highly nonlinear fiber, and/or frequency conversion in a nonlinear crystal. Pump conditioning can further comprise the implementation of chirped pulse amplification to produce high peak power pump pulses. To obtain an increased or optimized beam-quality from solid-state amplifiers cryogenic cooling can further be implemented in some embodiments.

Other embodiments are described herein.

For example, an embodiment of a pulsed light source utilizing optical parametric amplification in a nonlinear crystal is described. The pulsed light source comprises a seed oscillator that produces broad bandwidth optical pulses and a signal arm that receives optical pulses from the oscillator. The signal arm comprises at least one signal conditioning stage to produce a signal conditioned output at a signal wavelength. The pulsed light source also comprises a pump arm receiving optical pulses from the oscillator. The pump arm comprises at least one pump conditioning stage and a quantum amplifier configured to produce a pump conditioned output at a pump wavelength. The pump arm further comprises a pulse stretching stage disposed upstream of the quantum amplifier and a pulse compression stage disposed downstream of the quantum amplifier. The pulsed light source also comprises a parametric amplifier that comprises a nonlinear crystal. The parametric amplifier receives the signal conditioned output from the signal arm and the pump conditioned output from the pump arm. The signal conditioned output and the pump conditioned output are configured to overlap in both time and space in the nonlinear crystal, and the parametric amplifier produces amplified output at the signal wavelength. In some embodiments, the quantum amplifier can include a cryogenically cooled solid-state amplifier.

In another embodiment, a pulsed light source utilizing optical parametric amplification in a nonlinear crystal is provided. The pulsed light source comprises a seed oscillator that produces broad bandwidth optical pulses and a signal arm that receives optical pulses from the oscillator. The signal arm comprises at least one signal conditioning stage to produce signal conditioned output pulses at a signal wavelength. The pulsed light source also comprises a pump arm that receives optical pulses from the oscillator. The pump arm comprises at least one pump conditioning stage and a quantum amplifier to produce pump conditioned output pulses at a pump wavelength. One or more of the at least one signal conditioning stages or the at least one pump conditioning stages is nonlinear. The light source further includes a parametric amplifier comprising a nonlinear crystal. The parametric amplifier receives the signal conditioned output pulses from the signal arm and the pump conditioned output pulses from the pump arm. The signal conditioned output pulses and the pump conditioned output pulses are configured to overlap in both time and space in the nonlinear crystal, and the parametric amplifier produces amplified output at the signal wavelength. In some embodiments, the quantum amplifier can include a cryogenically cooled solid-state amplifier.

In another embodiment, a pulsed light source utilizing optical parametric amplification in a nonlinear crystal is provided. The pulsed light source comprises a fiber seed oscillator that produces broad bandwidth optical pulses. The pulsed light source also comprises a signal arm that receives optical pulses from the oscillator. The signal arm comprises at least one signal conditioning stage to produce signal conditioned output pulses at a signal wavelength. The signal conditioned output pulses comprise at least one pulse having a pulse energy greater than about 10 nJ. The light source also comprises a pump arm that receives optical pulses from the oscillator. The pump arm comprises at least one pump conditioning stage and a quantum amplifier to produce pump conditioned output pulses at a pump wavelength. The light source also comprises a parametric amplifier having a nonlinear crystal. The parametric amplifier receives the signal conditioned output pulses from the signal arm and the pump conditioned output pulses from the pump arm. The signal conditioned output pulses and the pump conditioned output pulses are configured to overlap in both time and space in the nonlinear crystal, and the parametric amplifier produces amplified output at the signal wavelength. In some embodiments, the quantum amplifier can include a cryogenically cooled solid-state amplifier.

In another embodiment, a pulsed light source utilizing optical parametric amplification in a non-linear crystal is disclosed. The pulsed light source comprises a seed oscillator that produces broad bandwidth optical pulses and a signal arm that receives optical pulses from the oscillator. The signal arm comprises at least one signal conditioning stage to produce signal conditioned output pulses at a signal wavelength. The pulsed light source also comprises a pump arm that receives optical pulses from the oscillator. The pump arm comprises at least one amplifier configured to output optical pump pulses at a pump wavelength. The pump pulses have temporal pulse characteristics comprising one or more of a pulse width in a range from about 100 fs to about 100 ps, an average power up to about 1 kW, and a pulse energy up to about 100 mJ at a repetition rate up to about 10 kHz. The at least one amplifier provides a nearly diffraction limited spatial profile. The pulsed light source also includes a parametric amplifier that receives the signal conditioned pulses from the signal arm and the output pump pulses from the pump arm and produces amplified output pulses at the signal wavelength. In some embodiments, the at least one amplifier can include a cryogenically cooled solid-state amplifier.

BRIEF DESCRIPTION OF THE DRAWINGS

These and other features will now be described with reference to the drawings summarized above. The drawings and the associated descriptions are provided to illustrate certain embodiments and not to limit the scope of the disclosure.

DETAILED DESCRIPTION OF PREFERRED EMBODIMENTS

Overview

Figure 1A:
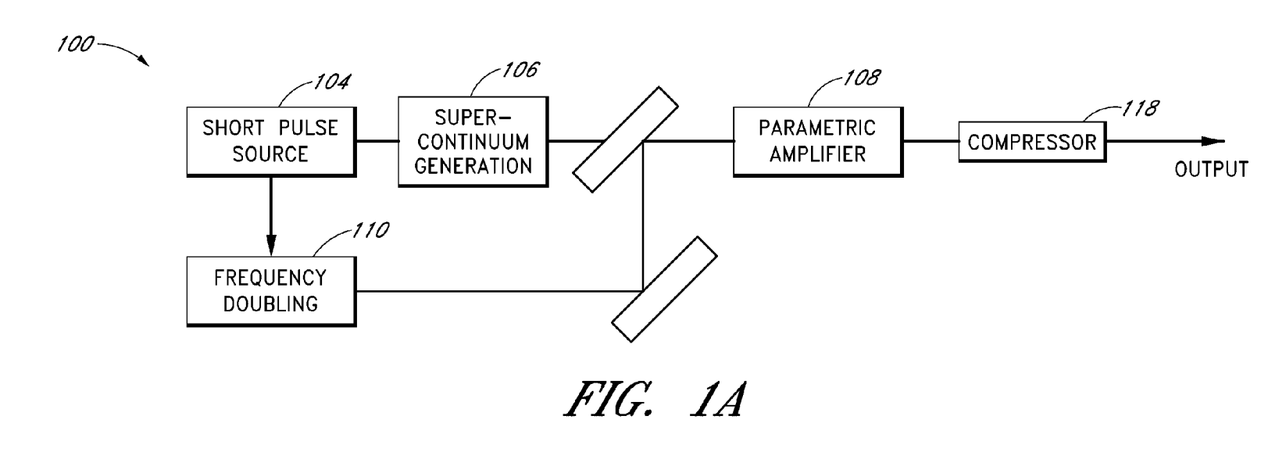
FIG. 1A schematically illustrates an example configuration for a parametric amplifier.

The most widely used conventional approach for compact NOPA was suggested by Wilhelm et al., 'Sub-20-fs pulses tunable across the visible from a blue pumped single-pass noncollinear parametric converter', Opt. Lett., vol. 22, No. 19, pp. 1494-1497 (1997). An example of this NOPA system configuration 100 is schematically shown in FIG. 1A. A recent review of NOPA work can be found in Cerullo et al., 'Ultrafast optical parametric amplifiers', Rev. Scientific Instruments, vol. 74, No. 1, pp. 1-18 (2003). NOPAs generally use a short pulse source 104 based on a single gain medium, such as Ti:sapphire, which is then split to generate both a seed signal via supercontinuum generation 106 in a bulk optical medium such as sapphire, as well as a parametric pump 110 (e.g., via frequency doubling) for parametric amplification of the seed signal in a parametric amplifier 108. Generally NOPAs amplify only weakly chirped signal pulses of less than 5 ps temporal width and are thus limited by the onset of self phase modulation of the pump as well as the amplified signal and group velocity mismatch between the noncollinear, large diameter seed and pump beams. Thus to date the amplified pulse energies for NOPAs are limited to a few hundreds of μJ. Moreover, these systems are generally cumbersome, complicated to operate, and cannot provide high average power output. NOPAs generally also comprise a pulse compressor, which compresses the weakly chirped signal pulses back to approximately the bandwidth limit.

Figure 1B:
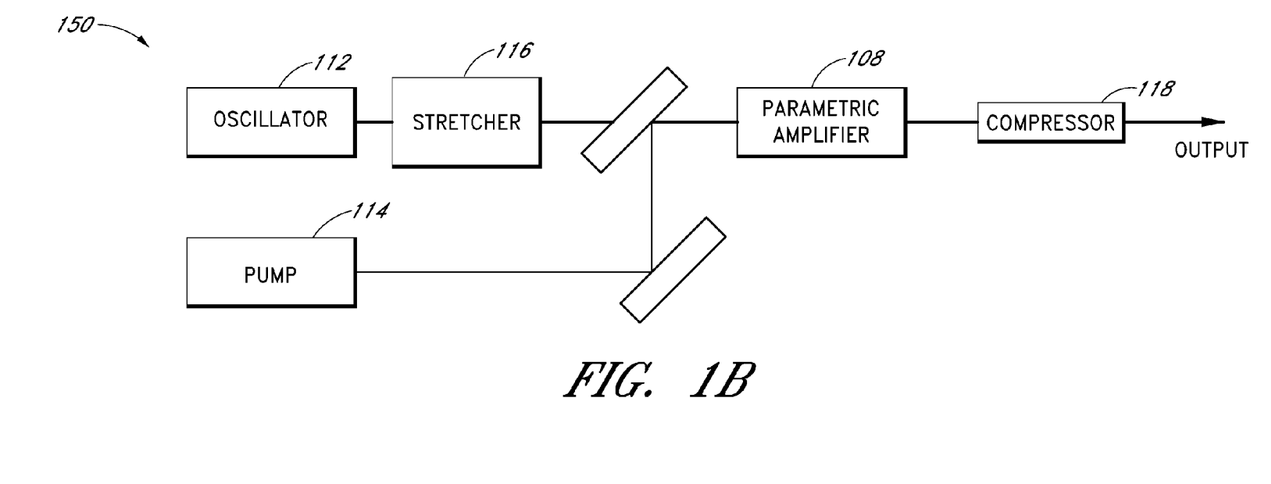
FIG. 1B schematically illustrates an example configuration for a parametric chirped pulse amplifier.

Examples of compact systems for OPA allowing for parametric amplification to mJ pulse energies and beyond were described in U.S. Pat. No. 6,181,463 and No. 6,208,458 (the '458 patent) to Galvanauskas et al., owned by the assignee of the present application, each patent hereby incorporated by reference herein in its entirety. An example of a system configuration 150 generally similar to certain embodiments described in the '458 patent is schematically shown in FIG. 1B. In this example system configuration, the seed signal for the parametric amplifier 108 is typically generated from a gain medium, which differs from the gain medium which provides the parametric pump 114. Using different gain media for seed signal and pump generation may be advantageous for the optimization of OPA at high pulse energies in some system configurations. An additional advantage is that it allows the use of specifically selected high power solid-state amplifiers for pumping of parametric amplifiers in some such system configurations. Electronic synchronization can be used to synchronize the oscillator pulse train with the pulses generated in the pump laser. In order to reduce or avoid group-velocity mismatch limitations, as well as to reduce self-phase modulation in the parametric amplifier, in the illustrated embodiment, the signal pulses are further stretched in a pulse stretcher 116 to a pulse width of the order of 5 ps and longer before parametric amplification. The stretched pulses are re-compressed in a compressor 118 back to approximately the bandwidth limit after parametric amplification. In order to obtain efficient energy conversion from pump to signal pulses, pump pulses with a width comparable to the signal pulses can be used. The amplification technique used for the example system configuration shown in FIG. 1B is generally referred to as parametric chirped pulse amplification (PCPA). The distinction between PCPA and NOPA in the literature is not fully established. In many PCPA systems, pulse stretching and compression by a factor>100-1000 are typically employed, whereas in many NOPA systems the compression factor is typically <100-1000. Also, in some system configurations, NOPAs are based on pump pulses<5 ps and PCPAs are based on pump pulses>5 ps. Both in NOPA and in PCPA, the pump can generally be split and directed to pump several sequential parametric amplification stages.

A generally similar approach to the PCPA described above was suggested in U.S. Pat. No. 6,870,664 to Jovanic et al., where independent pump and signal sources were also used.

Figure 2A:
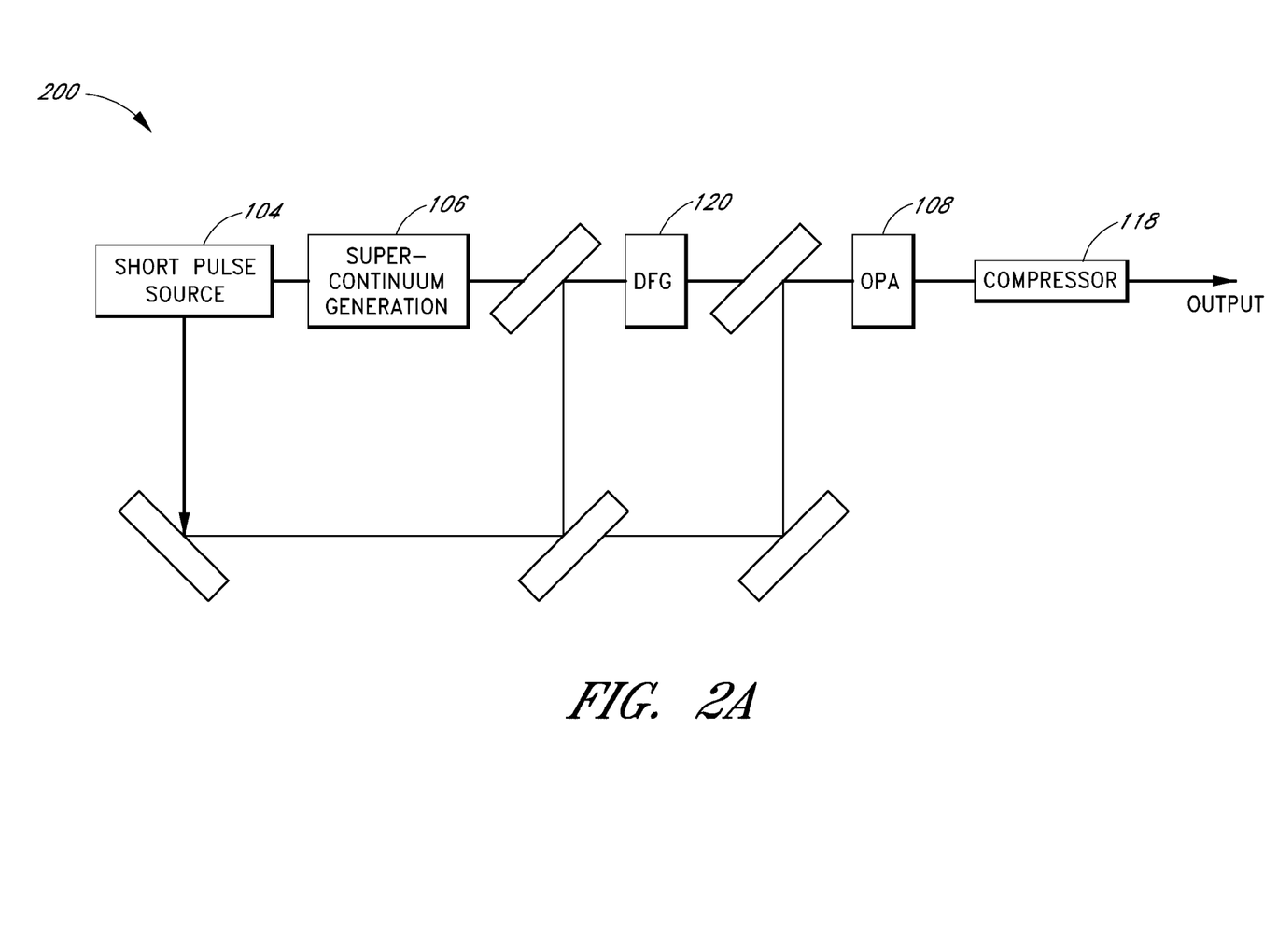
FIG. 2A schematically illustrates an example configuration for a parametric amplifier with a stable carrier envelope phase.

Recently a derivative of the NOPA design was described by Baltuska et al. 'Controlling the Carrier-Envelope Phase of Ultrashort Light Pulses with Optical Parametric Amplifiers', Physical Review Letters, vol. 88, No. 13, pp. 133901-1 to 133901-4, April (2002). An embodiment 200 of the design concept is schematically shown in FIG. 2A. A single gain medium is used to generate the seed signal as well as the pump. The seed signal is further conditioned via supercontinuum generation in a bulk optical element and difference frequency generation (DFG) 120 in a nonlinear crystal before being directed to the parametric amplification crystal (schematically shown as the OPA stage 108 in FIG. 2A). Typically only relatively weakly chirped signal pulses are used. The example system shown in FIG. 2A further parametrically amplifies pulses with a stable carrier envelope phase, because of the elimination of the carrier envelope offset frequency in the DFG stage. Carrier-envelope stable pulses were described in U.S. patent application Ser. No. 11/546,998, filed Oct. 13, 2006, entitled "Laser based frequency standards and their applications," to Hartl et al., published as U.S. Patent Publication No. 2007/0086713, the disclosures of which are incorporated by reference herein in their entireties. As discussed in Baltuska et al., phase stable pulses can also be generated in certain embodiments by using an OPA stage instead of a DFG stage and using the idler output of the OPA stage. The idler output is then used as a seed for subsequent OPA stages. The system configuration in certain such embodiments can be generally the same as shown in FIG. 2A with the DFG stage 120 replaced with an additional OPA stage.

Figure 2B:
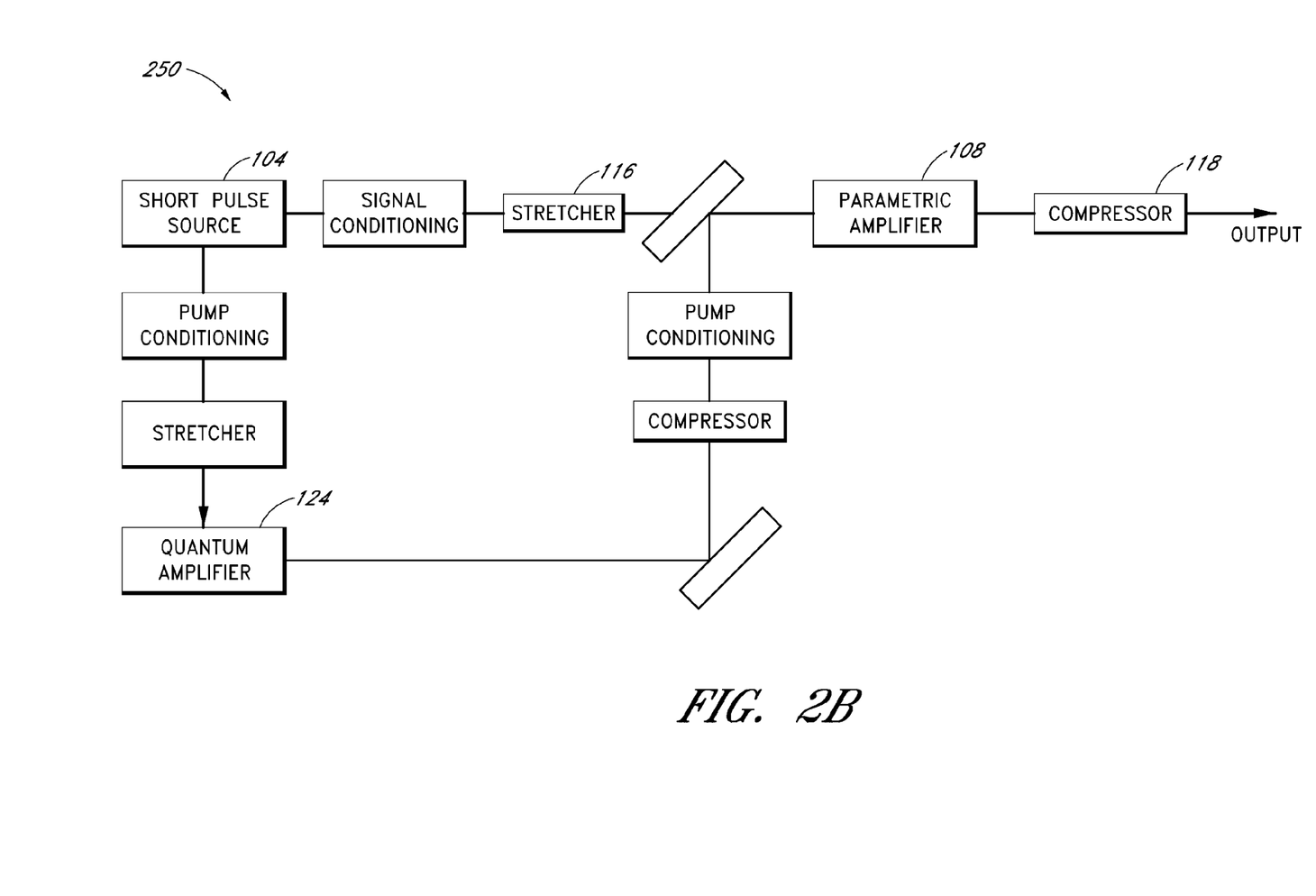
FIG. 2B schematically illustrates an example hybrid configuration based on a combination of a parametric amplifier with a parametric chirped pulse amplifier.

The advantages of NOPA, for example, the absence of electronic synchronization and the advantages of PCPA, for example, the potential for high energy amplification, were recently achieved in certain embodiments disclosed by Imeshev et al. in U.S. patent application Ser. No. 11/091,015 (the '015 application), published as U.S. Patent Publication No. 2005/0238070. The entire disclosures of the '015 application and the 2005/0238070 publication are expressly incorporated by reference herein and made part of this specification. An example of a system configuration 250 generally similar to certain embodiments described in the '015 application is schematically shown in FIG. 2B. In the embodiment schematically illustrated in FIG. 2B, in order to reduce or avoid the need for electronic synchronization, a single short pulse source 104 is used for seeding both pump and signal, where a quantum amplifier 124 is implemented for pump pulse energy increase. The pulses from the short pulse source directed to the signal arm can be further signal conditioned using nonlinear processes such as, for example, supercontinuum generation, Raman shifting, and/or frequency conversion in a nonlinear crystal to provide an appropriate wide bandwidth seed signal for the parametric amplifier. In the illustrated embodiment, a pulse stretcher 116 can further be inserted in front of the parametric amplifier crystal to reduce the influence of group-velocity mismatch and/or to achieve higher gain in the parametric amplifier crystal, which is typically significantly longer than used in NOPAs. A compressor 118 then compresses the signal pulses back to the transform limit. The pulses from the short pulse source directed to the pump arm can also be conditioned using nonlinear processes such as, e.g., supercontinuum generation, Raman shifting, and frequency conversion in a nonlinear crystal to provide an appropriate seed for the quantum amplifier 124 (or quantum amplifier chain), which is used to pump the parametric amplifier 108. In contrast to NOPA configurations, in certain embodiments of the system 250, the short pulse source 104 and the quantum amplifier 124 used for generating the parametric pump pulses are based on different gain media. Further, a pulse stretcher can be inserted in front of the quantum amplifier to reduce or avoid B-integral problems in the quantum amplifier. The stretched pulses amplified in the quantum amplifier can further be compressed before being directed for pumping the parametric amplifier. In some embodiments, which may be advantageous for commercial implementations, the short pulse source can be based on a fiber system. The example system 250 schematically shown in FIG. 2B can also comprise signal and/or pump conditioning stages. In at least some embodiment, at least one of these two stages is nonlinear.

Other systems have also used a single short pulse source for seeding both pump and signal, such as described in X. Yang et al., 'Multiterawatt laser system based on optical parametric chirped pulse amplification', Opt. Lett., vol. 27, pp. 1135-1137 (2002). However, in such systems both pump and signal were derived by linear signal or pump conditioning, namely, optical filtering. In the example by Yang et al., the pump and signal seeds were derived from a single modelocked Ti:sapphire oscillator using linear spectral filtering. Such systems with linear signal and pump conditioning greatly reduce the spectral bandwidth for parametric amplification and also severely limit the range of oscillator designs that can be used for seeding.

Another system based on a single short pulse source for seeding both pump and signal was described by Dubietis et al., in 'Powerful femtosecond pulse generation by chirped and stretched parametric amplification in BBO crystal', Opt. Comm. Vol. 88, pp. 437-440 (1992). However, the system by Dubietis et al., was operated at degeneracy, i.e. where the spectrum of the signal and idler are overlapping. Another limitation in the system by Dubietis was that both pump and signal generation were based on the same laser material (Nd: glass) with low thermal conductivity, which minimizes the utility of that system in high average power applications.

Following the '015 application, Miller et al., suggested in U.S. patent application Ser. No. 11/129,649 use of a single source for seeding both the OPA pump and signal. The same concept was later also reiterated in European Patent application EP 1724634 to Ishii et al.

Elements of the system embodiment shown in FIG. 2B were recently also described in Erny et al., 'Mid-infrared difference-frequency generation of ultrashort pulses tunable between 3.2 and 4.8 μm, Opt. Lett., vol. 32, no. 9, pp. 1138-1140 (2007). In the Erny system, an Er fiber laser is used as the short pulse source. The output from the Er fiber laser is split into two arms, where one arm constitutes the signal arm and the other arm constitutes the pump arm. The pulses in the pump arm are conditioned by anti-Stokes frequency shifting to the 1 μm spectral region. The pulses in the signal arm are conditioned using DFG between the conditioned pump pulses and the pulses directed to the signal arm, producing pulses frequency shifted to the 3.2-4.8 μm spectral region. No implementation for further amplification of the conditioned signal pulses has been described.

Elements of the system embodiment shown in FIG. 2B were recently also described in Marangoni et al., 'Near-infrared optical parametric amplifier at 1 MHz directly pumped by a femtosecond oscillator', Opt. Lett., vol. 32. pp. 1489-1491 (2007) and Schriever et al., 'Tunable pulses from below 300 to 970 nm with durations down to 14 fs based on a 2 MHz ytterbium-doped fiber system', Opt. Lett., vol. 33, pp. 192-194 (2008). However, the systems by Marangoni and Schriever did not consider amplification of the pump pulses in separate solid-state amplifiers, resulting in amplified signal energies smaller than 1 μJ.

The above systems generally were not directed towards optimization of beam quality after the parametric amplifier which is directly affected by the pump beam quality and generally no provisions were made to minimize parametric fluorescence in the amplified output. Further, to the inventors' knowledge, no parametric amplifier system pumped by cryogenically cooled high repetition rate solid-state amplifiers was previously described.

Example Embodiments of an Ultra-High Peak Power OPA

Figure 3:
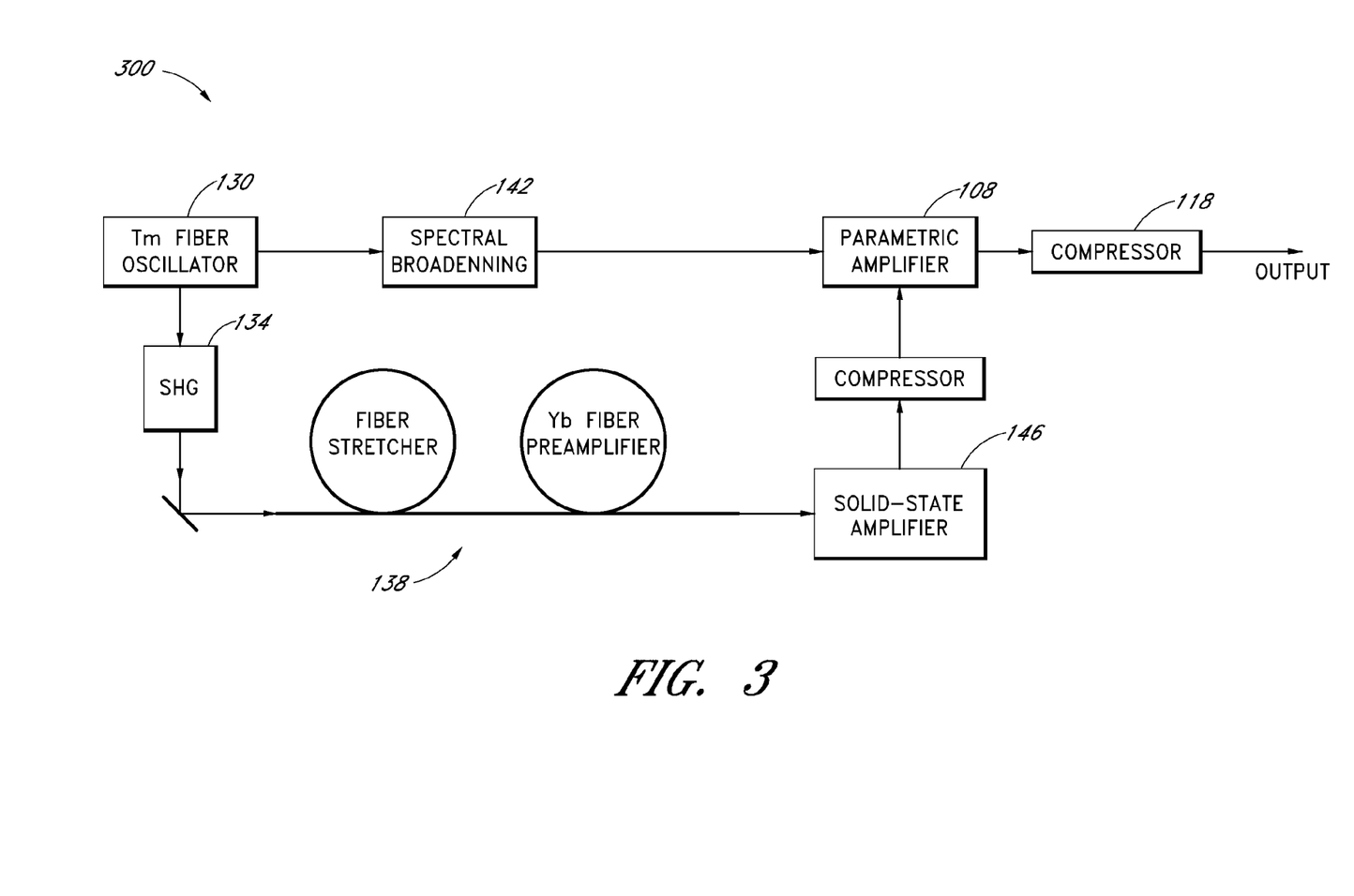
FIG. 3 schematically illustrates a first example embodiment of a high energy parametric amplifier.

An example parametric amplifier 300 according to a first embodiment is schematically shown in FIG. 3. A modelocked short pulse Tm doped fiber oscillator 130 can be used to seed both the signal and pump arm of the parametric amplifier. Tm fiber oscillators can be based on a dispersion compensated design as described in, for example, U.S. patent application Ser. No. 10/627,069, filed Jul. 25, 2003, entitled "Polarization maintaining dispersion controlled fiber laser source of ultrashort pulses," published as U.S. Patent Publication No. 2005/0018714, the entire disclosures of which are incorporated by reference herein in their entirety. Other Tm fiber oscillator designs are also possible. Further amplification of the Tm fiber oscillator using a Tm fiber amplifier can be implemented in other embodiments. Examples of such Tm fiber amplifiers have been discussed in the '015 application. As discussed in the '015 application, certain such Tm amplifier systems can generate pulse energies>10 nJ, which advantageously may be sufficient to suppress parasitic OPG in multistage parametric amplifiers up to amplified pulse energies of approximately 1 J. In other embodiments of the amplifier shown in FIG. 3, short pulse sources other than a Tm fiber oscillator can be utilized.

In some embodiments of the amplifier 300 shown in FIG. 3, to generate the shortest possible pulses from Tm fiber oscillators, third-order dispersion compensation can be implemented inside the Tm oscillator. For example, third-order dispersion compensation inside the oscillator can be accomplished with an intra-cavity nonlinearly chirped fiber Bragg grating. For example at a wavelength of 2060 nm typical silica fibers have a second order dispersion of −85 $ps^2$/km and a third order dispersion of 0.42 $ps^3$/km. For typical intra-cavity fiber lengths between 1-10 m, these dispersion values can be compensated using a small chirp variation across the fiber gratings. Nonlinear chirped fiber Bragg gratings were discussed in U.S. patent application Ser. No. 10/608,233 to Fermann et al., now U.S. Pat. No. 7,257,302. Further spectral broadening 142 in additional sections of nonlinear fiber can be implemented in some embodiments. Such Tm fiber systems can produce pulses compressible to 30 fs and shorter. In addition to or instead of Tm fiber oscillators, other bulk laser oscillators such as Cr-doped chalocogenide lasers can be implemented. These bulk lasers can further be spectrally broadened 142 in optical fibers. Many different types of oscillators 130 can be utilized in other embodiments of the amplifier shown in FIG. 3.

As schematically illustrated in the embodiment of FIG. 3, frequency conversion, including frequency doubling (e.g., the stage marked SHG 134 in FIG. 3) of the output from the Tm oscillator 130, can be implemented to provide a seed for a Yb fiber amplifier chain 138 which acts as a source for a solid-state amplifier 146 (or chain of solid-state amplifiers), which is used for pumping the parametric amplifier 108. In other embodiments, frequency conversion including, e.g., frequency tripling, frequency quadrupling, and so forth may be used instead of or in addition to frequency doubling by the SHG stage 134. In other embodiments, the amplifier chain 138 may comprise other types of amplifiers. Chirped pulse amplification in the pump amplifier chain can also be incorporated to prevent optical damage of the pump amplifier components and to reduce the B integral in the pump amplifier chain. Pump pulse stretching to 300 ps-3 ns duration can be conveniently incorporated using, for example, fiber and/or bulk grating stretchers. After amplification, the pump pulses are compressed back to 1-30 ps. One or several pulse pickers (not shown) are further incorporated in the pump pulse chain to reduce the repetition rate of the pump pulses, if desired. Fiber seeded chirped pulse solid-state regenerative and multipass amplifiers were previously described in U.S. patent application Ser. No. 10/960,923 to Harter et al, now U.S. Pat. No. 7,394,591.

The seed pulses from the oscillator 130 are amplified in one or more parametric amplifier stages. One such parametric amplifier 108 is shown in the embodiment of FIG. 3. The seed pulses can be used for seeding at either the signal wavelength or the idler wavelength of the parametric amplifier. The construction principles for multiple sequential parametric amplifiers are well known in the state of the art. After amplification at either the signal or idler wavelengths, these pulses are recompressed in the compressor 118 back to near the transform limit in the embodiment of FIG. 3.

In certain advantageous embodiments, to obtain reproducible PCPA action, near diffraction-limited pump pulses with spatially and temporally uniform energy distribution are highly desirable. In various such embodiments, one or more amplifiers in a pump amplifier chain are sufficiently cooled (e.g., using cryogenic cooling in some implementations) to limit thermal lensing, thermal birefringence, and/or any other thermal induced beam distortion. For example, in some embodiments one or more of the amplifiers in the pump amplifier chain are cryogenically cooled. Beam quality may be quantified using a number of standard measures, for example the Strehl ratio where the peak intensity of a measured beam is compared with the peak intensity of a diffraction-limited beam. In some embodiments a cooling profile may be implemented to compensate at least partially for thermal lensing. To generate such pump pulses in the energy range from 10 mJ-1 J and beyond at repetition rates in a range from about 1 kHz-10 kHz, cryogenic cooling of one or more of the solid-state amplifiers 146 can be implemented in certain embodiments.

In order to enable the efficient use of the chirped pulse amplification concept, solid-state gain media with a bandwidth of several nm at cryogenic temperatures of about 110 K, for example, can be incorporated. For example, in some implementations, Yb:YAG may have less utility for chirped pulse amplification at cryogenic temperatures than other media such as, e.g., Yb:KGW, Yb:KYW or Yb:CaF$_2$. Cryogenic cooling further reduces thermal birefringence in solid-state gain media, which is advantageous for the generation of well-polarized pump beams used in certain embodiments of chirped pulse and parametric amplification. In various embodiments of the disclosed systems, cryogenic cooling of a system component (e.g., a solid state amplifier, a solid state amplifier crystal, etc.) can provide a cryogenic temperature below about 150 K, below about 125 K, below about 100 K, below about 80 K, below about 50 K, or below some other temperature. In certain system embodiments, a cryogenically cooled component may be cooled with liquid nitrogen, liquid air, liquid oxygen, and/or other cryogenic coolants. In some embodiments, liquid helium can be used as a cryogenic coolant for cryogenic cooling to temperatures below about 20 K, below about 10 K, or below about 5 K. The above cryogenic temperatures and cryogenic coolants are non-limiting examples. Other cryogenic temperatures and/or cryogenic coolants can be used in other embodiments to provide suitable cryogenic cooling.

In other embodiments, many other solid-state amplifier materials can be used. Such solid-state amplifier systems can for example comprise a regenerative amplifier in conjunction with one or more stages of single and/or multi-pass amplifiers. Average power extraction from such amplifiers in the range of 100 W and higher is possible. Kilowatt average powers may be obtained by using cryo-cooled slab amplifiers with appropriate reimaging cylindrical optics in some embodiments of the amplifier 300 of FIG. 3.

Cryogenically-cooled Yb-based lasers were described by Lacovara et al. in "Room temperature diode pumped Yb:YAG laser," Opt. Lett., 16, 1089 (1991) and later in U.S. Pat. No. 6,195,372 to Brown et al. However, these authors did not describe any cryo-cooled solid-state amplifiers. Ultra-high gain cryo-cooled multi-pass and regenerative ultrafast solid-state amplifiers were described in U.S. Pat. No. 6,804,287 to Backus et al. However, the system by Backus et al. relies on a low-energy oscillator for seeding the amplifier, which is a possible option for high gain materials but can produce pulse-compressibility problems in chirped pulse regenerative amplifiers based on low-gain materials. Also, only one amplifier stage was considered, which typically is not sufficient for low gain amplifier materials. Cryo-cooled laser systems were also disclosed by Kawanaka et al., in U.S. patent application Ser. No. 11/037,465, but were limited to Yb:YAG as the gain material. Another cryo-cooled laser system was described by Brown in U.S. application Ser. No. 11/615,417. However, this system was limited to laser configurations and moreover, the '417 application describes specific implementations for the construction of heat sinks.

Figure 4:
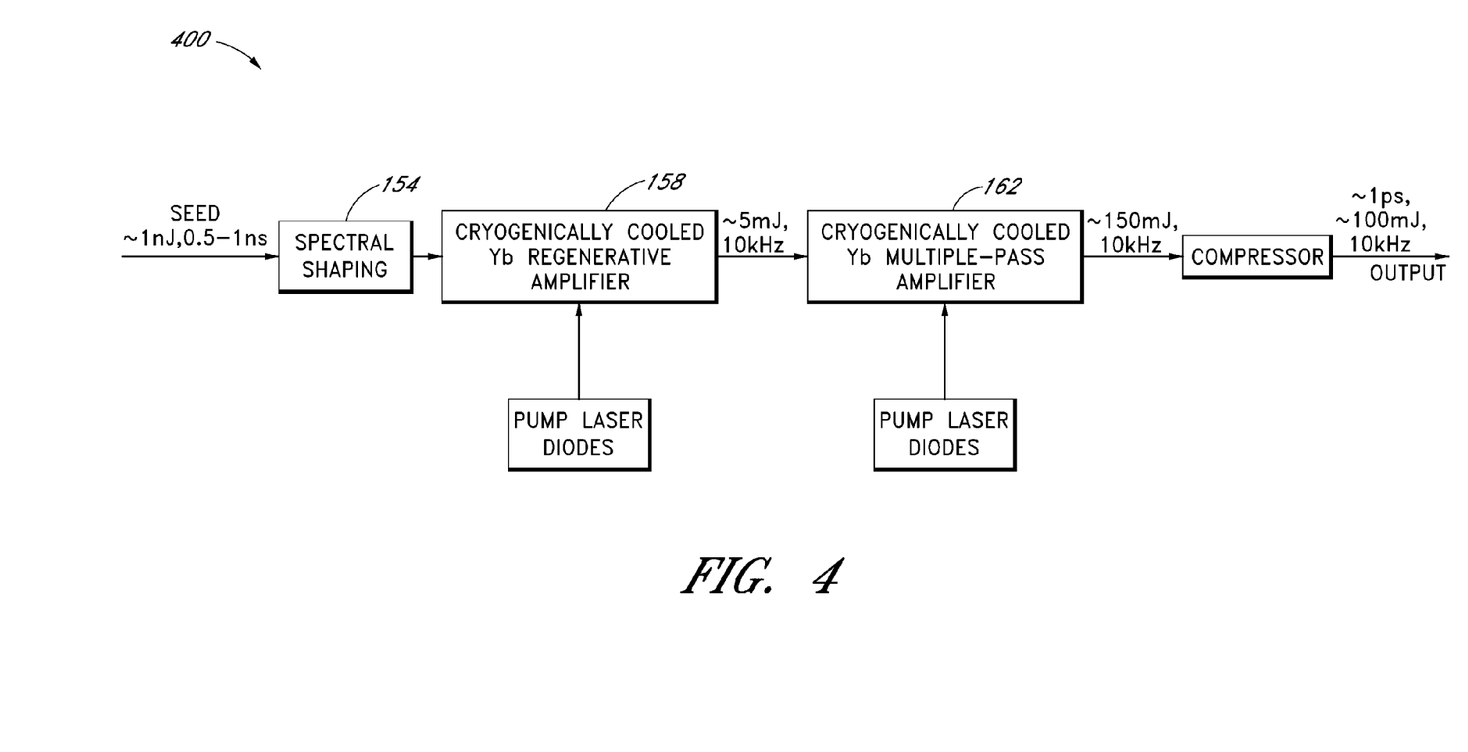
FIG. 4 schematically illustrates an example embodiment of a pump amplifier chain.

An example embodiment of a pump amplifier chain 400 capable of producing 100 mJ pulses at repetition rates of 1 kHz, and in at least one embodiment up to 10 kHz, is schematically shown in FIG. 4. Embodiments of the pump amplifier chain 400 can be used as the pump amplifier 138 shown in FIG. 3. In the pump amplifier embodiment 400, seed pulses from, for example, a Tm doped fiber source, are spectrally conditioned 154 via, e.g., frequency doubling to match the seed bandwidth to the amplification bandwidth of a Yb-doped, cryo-cooled solid state regenerative amplifier 158. In certain embodiments, the seed pulses have a pulse energy of about 1 nJ and pulse widths in a range from about 500 ps to about 1 ns.

In certain embodiments of the pump amplifier chain, after several tens of roundtrips inside a diode end-pumped regenerative amplifier cavity, the pulses are amplified to an approximate energy level of 5 mJ at 1 kHz repetition rates (and up to about 10 kHz repetition rate in at least one embodiment) and directed to a diode-pumped multiple pass power amplifier. In some embodiments, the power amplifier may comprise a cryo-cooled Yb-doped multiple pass solid state amplifier 162. In some embodiments, the solid state regenerative amplifier 158 and/or the multiple pass solid state amplifier 162 are cryogenically cooled to temperatures below about 150 K, below about 125 K, below about 100 K, or below about 80 K. In one example embodiment, the amplifiers 158, 162 can be cooled to a temperature of about 110 K. In other embodiments, cryogenic cooling at other temperatures is utilized. In certain embodiments, the solid state regenerative amplifier 158 and/or the multiple pass solid state amplifier 162 are cryogenically cooled with one or more cryogenic coolants such as, e.g., liquid nitrogen, liquid air, and/or liquid oxygen.

In some embodiments, amplified pulses having pulse energies of about 150 mJ at up to about a 10 kHz repetition rate are directed to a compressor. Embodiments of the illustrated pump amplifier chain 400 can provide picosecond pulses at 1 kW average power. In some embodiments, the pulses may have energies of about 100 mJ and a repetition rate of up to about 10 kHz. In some of these embodiments, cryo-cooling of some or all amplifier crystals provides nearly diffraction limited output beams with reduced or minimal thermal birefringence. In other embodiments of the pump amplifier chain 400, other pulse energies, repetition rates, pulse widths, etc. may be provided.

In some embodiments, chirped pulse amplification (CPA) in the pump pulses is not utilized. In other embodiments, CPA may advantageously be used to increase or maximize the obtainable pulse energies for short pump pulses. In some embodiments, since the pump pulses do not need to be coupled into any fibers, small beam-pointing instabilities of the pump pulses can be tolerated. Chirped pump pulses further allow efficient temporal shaping for increased or optimum energy extraction from PCPA. Additionally, in some embodiments, when using CPA with short 1 ps-100 ps pump pulses, compression of the signal pulses down to the 10 fs-50 fs range is greatly simplified, since compression ratios of $2\times10^1$–$1\times10^4$ are typically used. In embodiments using pump pulses of 1 ns width, compression ratios of $1\times10^5$ are typically used for pulse compression down to 10 fs in PCPA. Such high compression ratios may be difficult to achieve in practice in certain PCPA implementations.

In some embodiments, to obtain wide-bandwidth PCPA, phase-matching in periodically poled crystals, for example, as described in the '015 application, can be implemented. In other embodiments, other types of OPA crystals with a large gain bandwidth can be implemented. For example, OPA crystals can be selected from PPLN, PPKTP, RTP, RTA, KTA, KDP, BBO, and/or BiBO. Other OPA crystals can be used.

Embodiments of the pulse compressor 118 for the signal pulses schematically shown, for example, in FIG. 3 can be implemented efficiently with a block of bulk material such as, e.g., silica glass. In order to use such compressor embodiments, the chirp of the signal pulses has to have the opposite sign of the dispersion of the bulk material or glass at the operation wavelength. For example, using multiple passes through a block of silica glass, dispersion values as high as 40 fs/nm/m can be achieved, which means that a pulse with a 200 nm bandwidth can be compressed from a width of 8 ps to the bandwidth limit in a 1 m length of glass. Alternatively or additionally, one or more conventional grating pair compressors or chirped mirrors, as well known in the state of the art, can be implemented for signal pulse compressors. Also, in some embodiments, adaptive phase compensation stages can be implemented in the signal arm either before parametric amplification or in the pulse compression stage. Adaptive phase compensation schemes are well known in the state of the art and can, for example, be based on liquid crystal spatial light modulators in conjunction with a bulk grating pulse stretcher configuration. These adaptive phase compensation schemes can be implemented in various embodiments to obtain reduced, or even the shortest, possible pulses after pulse compression.

Figure 5:
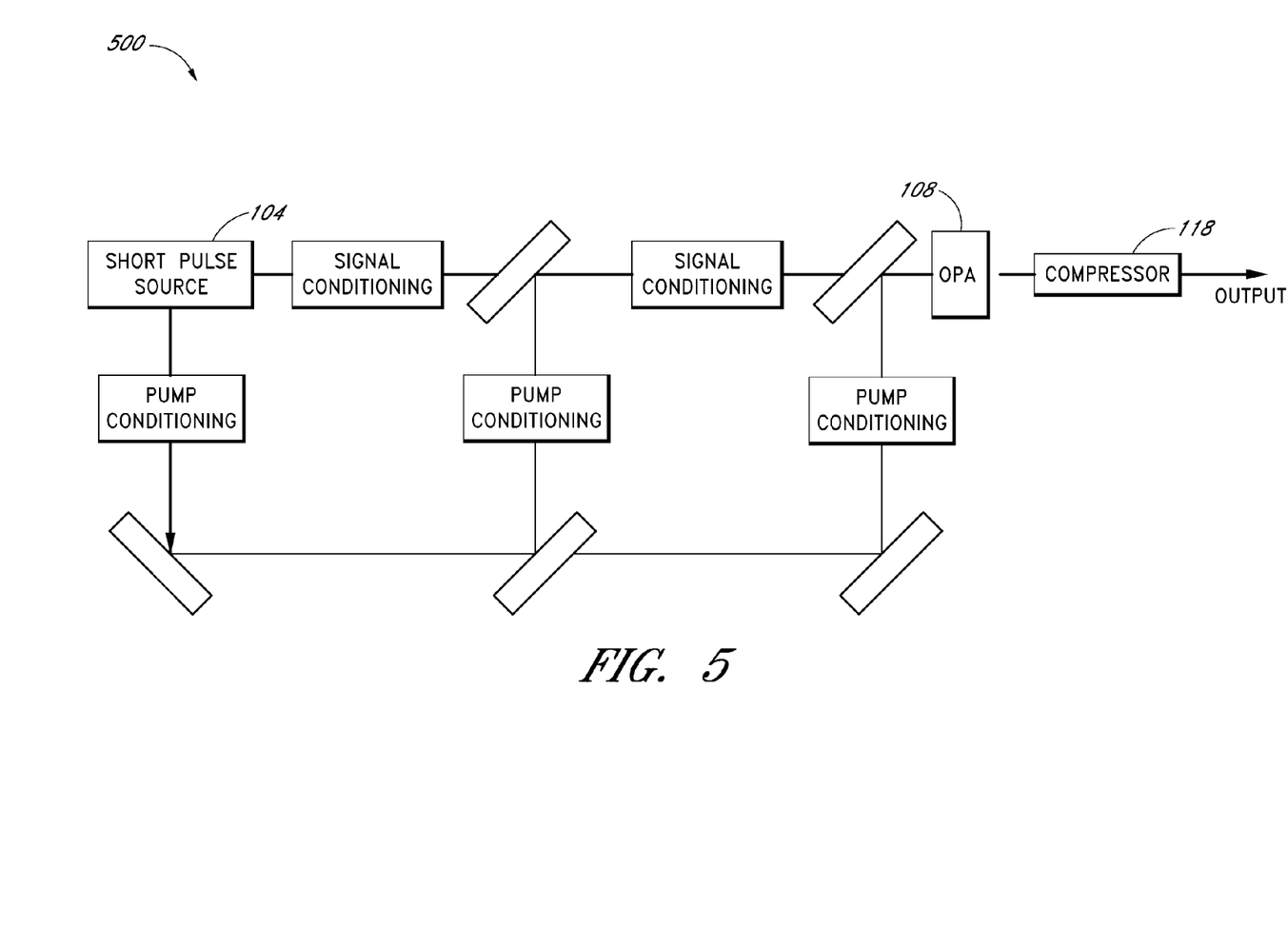
FIG. 5 schematically illustrates a second example embodiment of a high energy parametric amplifier.

As discussed in the '015 application, for example, the seed oscillator can be substituted with an Er oscillator in certain embodiments of the parametric amplifier. In certain such embodiments, the seed oscillator can seed at the signal wavelength and/or the idler wavelength. The seed oscillator may also be used to feed the pump arm of the parametric amplifiers. An example embodiment of a parametric amplifier 500 using an Er fiber seed oscillator as the short pulse source 104 is schematically shown in FIG. 5. The Er oscillator can be parametrically amplified directly or appropriate signal conditioning stages can be implemented to further spectrally broaden the Er oscillator. These signal conditioning stages can comprise, for example, spectral broadening and supercontinuum generation in an optical fiber or bulk optical medium, optical parametric generation in a nonlinear crystal, Raman shifting, and/or difference frequency generation with appropriately conditioned pump pulses. Pump pulse conditioning can comprise, for example, anti-Stokes frequency shifting and/or spectral broadening. In some embodiments, the anti-Stokes frequency shifted pump pulses can then further be amplified in an amplifier chain comprising both fiber and solid-state amplifiers. In some embodiments, the pump and/or the signal conditioning can include temporal pulse stretching and compression. In other embodiments, other short pulse sources can be used. For example, the Er fiber seed oscillator can be substituted with an Yb or Nd based fiber and/or solid state laser system. Pump and/or signal conditioning stages generally similar to those discussed above can be used for parametric amplification.

In other embodiments, the solid-state amplifier chain in the pump arm can be substituted with phased-arrays of fiber amplifier chains and/or coherently combined multi-core fiber chirped pulse amplification systems. Embodiments of such phased array ultrafast fiber amplifiers can also comprise diffractive optical elements for optical beam combination and shaping. Phased array ultrafast fiber amplifiers were described in, for example, U.S. patent application Ser. No. 11/546,998, filed Oct. 13, 2006, entitled "Laser based frequency standards and their applications," to Hartl et al., published as U.S. Patent Publication No. 2007/0086713, and U.S. patent application Ser. No. 12/365,514, filed Feb. 4, 2009, entitled "High power parallel fiber arrays," to Fermann et al., which claims priority to U.S. Provisional Application No. 61/026,952, entitled "High Power Parallel Fiber Arrays", filed Feb. 7, 2008. The disclosures of U.S. patent application Ser. No. 11/546,998, U.S. patent application Ser. No. 12/365, 514, and U.S. Application No. 61/026,952 are hereby incorporated by reference herein in their entireties.

Examples and Additional Embodiments

Various non-limiting, illustrative, example embodiments have been described above. Other embodiments of pulsed light sources, parametric amplifiers, and so forth may be implemented according to the teachings of the present application. For example, various additional examples and embodiments are described below. In the following examples and embodiments, the phrase "signal/idler" is to be understood as including, in various embodiments, a signal, an idler, or both a signal and an idler. For example, embodiments of a pulsed light source comprising a "signal/idler arm" include pulsed light source embodiments comprising a signal arm, pulsed light source embodiments comprising an idler arm, and pulsed light source embodiments comprising both a signal arm and an idler arm.

In at least one embodiment, a pulsed light source utilizing optical parametric amplification in a nonlinear crystal is provided. The pulsed light source may comprise a seed oscillator producing broad bandwidth oscillator pulses as output. The oscillator output may be split into a signal/idler arm and a pump arm. The signal/idler arm may include at least one signal/idler conditioning stage to produce a conditioned signal/idler output. The pump arm may include at least one pump conditioning stage and a quantum amplifier to produce a conditioned pump output. The pump arm may also include a pulse stretching stage inserted upstream of the quantum amplifier and a pulse compression stage inserted downstream of the quantum amplifier. The conditioned signal/idler output is directed to a parametric amplifier, and the parametric amplifier amplifies the signal/idler output. The parametric amplifier is pumped by the conditioned pump output. The conditioned signal/idler output and the conditioned pump output are configured to overlap in both time and space in the nonlinear crystal.

In various embodiments of the pulsed light source:

The seed oscillator may comprise a pulsed fiber system.

The pulsed fiber system may include a modelocked fiber oscillator and a fiber amplifier.

The fiber system may comprise Er, Er/Yb, Tm, Tm:Yb, Nd and/or Yb fibers.

The signal/idler conditioning stage may include a signal/idler pulse stretcher.

The pulsed light source may include a compressor disposed downstream of the parametric amplifier.

The pulsed light source may include more than one parametric amplifier.

The signal/idler conditioning stage may include a nonlinear frequency conversion element.

The signal/idler conditioning stage may include a nonlinear frequency broadening element.

The signal/idler conditioning stage may include a nonlinear difference frequency generation (DFG) element.

The signal/idler conditioning stage may include a nonlinear OPA element.

The signal/idler conditioning stage may include a supercontinuum generation element.

The pump conditioning stage may include a nonlinear frequency shifting element.

The pump conditioning stage may include a nonlinear frequency broadening element.

The pump conditioning stage may include a supercontinuum generation element.

The quantum amplifier may use an optical material which is different from the optical material used for the seed oscillator.

The quantum amplifier may include a fiber amplifier.

The fiber amplifier may comprise one or more coherently combined fiber arrays.

The quantum amplifier may include a solid state amplifier.

The quantum amplifier may include a combination of a fiber amplifier with a solid state amplifier.

The quantum amplifier may include a cryogenically cooled solid-state amplifier.

The quantum amplifier may comprise an Yb-doped solid state amplifier material.

The solid state amplifier material may use Yb-doped materials including Yb:KGW, Yb:KYW, Yb:CaF$_2$, Yb:YAG, Yb:BOYS, Yb:CALGO, and/or Yb:SYS.

The parametric amplifier may use PPLN, PPKTP, RTP, RTA, KTA, KDP, BBO, and/or BiBO.

In at least one embodiment a pulsed light source utilizing optical parametric amplification in a nonlinear crystal is provided. The pulsed light source may comprise a seed oscillator producing broad bandwidth oscillator pulses as output. The oscillator output may be split into a signal/idler arm and a pump arm. The signal/idler arm may include at least one signal/idler conditioning stage to produce a conditioned signal/idler output. The pump arm may include at least one pump conditioning stage and a quantum amplifier to produce a conditioned pump output. The signal/idler conditioning stage and the pump conditioning stage may be configured such that at least either one of the signal/idler and pump conditioning stages is nonlinear. The conditioned signal/idler output is directed to a parametric amplifier, and the parametric amplifier amplifies the signal/idler output. The parametric amplifier is pumped by the conditioned pump output. The conditioned signal/idler output and the conditioned pump output are configured to overlap in both time and space in the nonlinear crystal.

In various embodiments of the pulsed light source:

The pump conditioning stage may include a pulse stretcher and a pulse compressor.

The seed oscillator may comprise a pulsed fiber system

The pulsed fiber system may include a modelocked fiber oscillator and a fiber amplifier.

The fiber system may comprise Er, Er/Yb, Tm, Tm:Yb, Nd and/or Yb fibers.

The signal/idler conditioning stage may include a signal/idler pulse stretcher.

The pulsed light source may include a compressor disposed downstream of the parametric amplifier.

The pulsed light source may include more than one parametric amplifier.

The signal/idler conditioning stage may include a nonlinear frequency conversion element.

The signal/idler conditioning stage may include a nonlinear frequency broadening element.

The signal/idler conditioning stage may include a nonlinear difference frequency generation element.

The signal/idler conditioning stage may include a nonlinear OPA element.

The signal/idler conditioning stage may include a supercontinuum generation element.

The pump conditioning stage may include a nonlinear frequency shifting element.

The pump conditioning stage may include a nonlinear frequency broadening element.

The pump conditioning stage may include a supercontinuum generation element.

The quantum amplifier may use an optical material which is different from the optical material used for the seed oscillator.

The quantum amplifier may include a fiber amplifier.

The quantum amplifier may include a solid state amplifier.

The quantum amplifier may include a combination of a fiber amplifier with a solid state amplifier.

The fiber amplifier may comprise one or more coherently combined fiber arrays.

The quantum amplifier may include a cryogenically cooled solid-state amplifier.

The quantum amplifier may include an Yb-doped solid state amplifier material.

The solid state amplifier material may comprise Yb-doped materials including Yb:KGW, Yb:KYW, Yb:CaF$_2$, Yb:YAG, Yb:BOYS, Yb:CALGO, and/or Yb:SYS.

The parametric amplifier may comprise PPLN, PPKTP, RTP, RTA, KTA, KDP, BBO, and/or BiBO.

In at least one embodiment, a pulsed light source utilizing optical parametric amplification in a nonlinear crystal is provided. The pulsed light source may comprise a fiber seed oscillator producing broad bandwidth oscillator pulses as output. The oscillator output may be split into a signal/idler arm and a pump arm. The signal/idler arm may include a signal/idler conditioning stage to produce a conditioned signal/idler output. The pump arm may include at least one pump conditioning stage and a quantum amplifier to produce a conditioned pump output. The conditioned signal/idler output is directed to a parametric amplifier, and the parametric amplifier amplifies the signal/idler output. The conditioned signal/idler output may include a pulse energy greater than about 10 nJ. The parametric amplifier is pumped by the conditioned pump output. The conditioned signal/idler output and the conditioned pump output are configured to overlap in both time and space in the nonlinear crystal.

In various embodiments of the pulsed light source:

The pump conditioning stage may include a pulse stretcher and a pulse compressor.

The seed oscillator may comprise a pulsed fiber system

The pulsed fiber system may include a modelocked fiber oscillator and a fiber amplifier.

The fiber system may comprise Er, Er/Yb, Tm, Tm:Yb, Nd and/or Yb fibers.

The signal/idler conditioning stage may include a signal/idler pulse stretcher.

The pulsed light source may include a compressor disposed downstream of the parametric amplifier.

The pulsed light source may include more than one parametric amplifier.

The signal/idler conditioning stage may include a nonlinear frequency conversion element.

The signal/idler conditioning stage may include a nonlinear frequency broadening element.

The signal/idler conditioning stage may include a nonlinear difference frequency generation element.

The signal/idler conditioning stage may include a nonlinear OPA element.

The signal/idler conditioning stage may include a supercontinuum generation element.

The pump conditioning stage may include a nonlinear frequency shifting element.

The pump conditioning stage may include a nonlinear frequency broadening element.

The pump conditioning stage may include a supercontinuum generation element.

The quantum amplifier may use an optical material which is different from the optical material used for the seed oscillator.

The quantum amplifier may include a fiber amplifier.

The fiber amplifier may comprise one or more coherently combined fiber arrays.

The quantum amplifier may include a solid state amplifier.

The quantum amplifier may include a combination of a fiber amplifier with a solid state amplifier.

The quantum amplifier may include a cryogenically cooled solid-state amplifier.

The quantum amplifier may include an Yb-doped solid state amplifier material.

The solid state amplifier material may comprise Yb-doped materials including Yb:KGW, Yb:KYW, Yb:CaF$_2$, Yb:YAG, Yb:BOYS, Yb:CALGO, and/or Yb:SYS.

The parametric amplifier may comprise PPLN, PPKTP, RTP, RTA, KTA, KDP, BBO, and/or BiBO.

The example numerical parameters (e.g., values and/or ranges) described herein are intended to be illustrative and not to limit the scope of the methods and systems disclosed herein. Other systems, setups, and parameters may be used in other implementations, which may provide the same or different results. Many variations are possible and are contemplated within the scope of this disclosure. Components, features, structures, and/or elements may be added, removed, or rearranged. Additionally, process or method steps or acts may be added, removed, or reordered.

For purposes of this disclosure, certain aspects, advantages, and novel features are described herein. It is to be understood that not necessarily all such advantages may be achieved in accordance with any particular embodiment. Thus, for example, those skilled in the art will recognize that the systems and methods may be embodied or carried out in a manner that achieves one advantage or group of advantages as taught herein without necessarily achieving other advantages as may be taught or suggested herein. Furthermore, embodiments may include several novel features, no single one of which is solely responsible for the embodiment's desirable attributes or which is essential to practicing the systems and methods described herein. Additionally, in any method or process disclosed herein, the acts or operations of the method or process may be performed in any suitable sequence and are not necessarily limited to any particular disclosed sequence.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain embodiments of the inventions disclosed herein have been described, these embodiments have been presented by way of example only, and are not intended to limit the scope of the inventions disclosed herein. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, substitutions, equivalents, and changes in the form of the methods and systems described herein may be made without departing from the spirit of the inventions disclosed herein.

The above description of various embodiments has been given by way of example and is not intended to be a limitation on the scope of this disclosure. From the disclosure given, those skilled in the art will not only understand the present application and its attendant advantages, but will also find apparent various equivalents, changes and modifications to the structures and methods disclosed. It is sought, therefore, to cover all such equivalents, changes and modifications as fall within the spirit and scope of the application.

What is claimed is:

1. A pulsed light source utilizing optical parametric amplification in a nonlinear crystal, the pulsed light source comprising:
    a seed oscillator producing broad bandwidth optical pulses;
    a signal arm receiving optical pulses from the oscillator and comprising at least one signal conditioning stage to produce a signal conditioned output at a signal wavelength;
    a pump arm receiving optical pulses from the oscillator and comprising at least one pump conditioning stage and a quantum amplifier configured to produce a pump conditioned output at a pump wavelength, said quantum amplifier comprising a cryogenically cooled solid-state amplifier, said pump arm further comprising a pulse stretching stage disposed upstream of said quantum amplifier and a pulse compression stage disposed downstream of said quantum amplifier; and
    a parametric amplifier comprising a nonlinear crystal, said parametric amplifier receiving said signal conditioned output from said signal arm and said pump conditioned output from said pump arm, said signal conditioned output and said pump conditioned output configured to overlap in both time and space in said nonlinear crystal, said parametric amplifier producing amplified output at said signal wavelength.

2. The pulsed light source according to claim 1, wherein the seed oscillator comprises a pulsed fiber system.

3. The pulsed light source according to claim 2, wherein the pulsed fiber system comprises a modelocked fiber oscillator and a fiber amplifier.

4. The pulsed light source according to claim 2, wherein said pulsed fiber system comprises at least one doped fiber selected from the group consisting of Er, Er/Yb, Tm, Tm:Yb, Nd and Yb doped fibers.

5. The pulsed light source according to claim 1, wherein said pulsed light source comprises more than one parametric amplifier.

6. The pulsed light source according to claim 1, wherein said at least one signal conditioning stage comprises a nonlinear difference frequency generation element.

7. The pulsed light source according to claim 1, wherein said at least one signal conditioning stage comprises an optical parametric amplification (OPA) element.

8. The pulsed light source according to claim 1, wherein said quantum amplifier comprises a coherently combined fiber array.

9. The pulsed light source according to claim 1, wherein said quantum amplifier comprises a fiber amplifier and a solid state amplifier.

10. The pulsed light source according to claim 1, wherein said quantum amplifier comprises an Yb-doped solid-state amplifier material.

11. The pulsed light source according to claim 10, wherein said Yb-doped solid state amplifier material comprises at least one of: Yb:KGW, Yb:KYW, Yb:CaF$_2$, Yb:YAG, Yb:BOYS, Yb:CALGO, or Yb:SYS.

12. The pulsed light source according to claim 1, wherein said parametric amplifier comprises at least one of PPLN, PPKTP, RTP, RTA, RTA, KDP, BBO, or BiBO.

13. The pulsed light source according to claim 1, where said parametric amplifier amplifies a signal received at the signal wavelength of said parametric amplifier.

14. The pulsed light source according to claim 1, where said parametric amplifier amplifies a signal received at an idler wavelength of said parametric amplifier.

15. A pulsed light source utilizing optical parametric amplification in a nonlinear crystal, said pulsed light source comprising:
- a seed oscillator producing broad bandwidth optical pulses;
- a signal arm receiving optical pulses from said oscillator, said signal arm comprising at least one signal conditioning stage to produce signal conditioned output pulses at a signal wavelength;
- a pump arm receiving optical pulses from said oscillator, said pump arm comprising at least one pump conditioning stage and a quantum amplifier to produce pump conditioned output pulses at a pump wavelength, said quantum amplifier comprising a cryogenically cooled solid-state amplifier, wherein one or more of the at least one signal conditioning stages or the at least one pump conditioning stages is nonlinear; and
- a parametric amplifier comprising a nonlinear crystal, said parametric amplifier receiving said signal conditioned output pulses from said signal arm and said pump conditioned output pulses from said pump arm, said signal conditioned output pulses and said pump conditioned output pulses configured to overlap in both time and space in said nonlinear crystal, said parametric amplifier producing amplified output at said signal wavelength.

16. The pulsed light source according to claim 15, wherein the seed oscillator comprises a pulsed fiber system.

17. The pulsed light source according to claim 16, wherein the pulsed fiber system comprises a modelocked fiber oscillator and a fiber amplifier.

18. The pulsed light source according to claim 16, wherein said pulsed fiber system comprises at least one doped fiber selected from the group consisting of Er, Er/Yb, Tm, Tm:Yb, Nd and Yb doped fibers.

19. The pulsed light source according to claim 15, wherein said pulsed light source comprises more than one parametric amplifier.

20. The pulsed light source according to claim 15, wherein said quantum amplifier comprises a coherently combined fiber array.

21. The pulsed light source according to claim 15, wherein said quantum amplifier comprises a fiber amplifier and a solid state amplifier.

22. The pulsed light source according to claim 15, wherein said quantum amplifier comprises an Yb-doped solid-state amplifier material.

23. The pulsed light source according to claim 22, wherein said Yb-doped solid-state amplifier material comprises at least one of Yb:KGW, Yb:KYW, Yb:CaF$_2$, Yb:YAG, Yb:BOYS, Yb:CALGO, or Yb:SYS.

24. The pulsed light source according to claim 15, wherein said parametric amplifier comprises at least one of PPLN, PPKTP, RTP, RTA, RTA, KDP, BBO, or BiBO.

25. A pulsed light source utilizing optical parametric amplification in a nonlinear crystal, said pulsed light source comprising:
- a fiber seed oscillator producing broad bandwidth optical pulses;
- a signal arm receiving optical pulses from said oscillator and comprising at least one signal conditioning stage to produce signal conditioned output pulses at a signal wavelength, said signal conditioned output pulses comprising at least one pulse having a pulse energy greater than about 10 nJ;
- a pump arm receiving optical pulses from said oscillator, said pump arm comprising at least one pump conditioning stage and a quantum amplifier to produce pump conditioned output pulses at a pump wavelength, said quantum amplifier comprising a cryogenically-cooled solid-state amplifier; and
- a parametric amplifier comprising a nonlinear crystal, said parametric amplifier receiving said signal conditioned output pulses from said signal arm and said pump conditioned output pulses from said pump arm, said signal conditioned output pulses and said pump conditioned output pulses configured to overlap in both time and space in said nonlinear crystal, said parametric amplifier producing amplified output at said signal wavelength.

26. A pulsed light source utilizing optical parametric amplification in a non-linear crystal, the pulsed light source comprising:
- a seed oscillator producing broad bandwidth optical pulses;
- a signal arm receiving optical pulses from said oscillator and comprising at least one signal conditioning stage to produce signal conditioned output pulses at a signal wavelength;
- a pump arm receiving optical pulses from said oscillator, said pump arm comprising: at least one amplifier configured to output optical pump pulses at a pump wavelength, said pump pulses having temporal pulse characteristics comprising: a pulse width in a range from about 100 fs to about 100 ps, an average power up to about 1 kW, and a pulse energy up to about 100 mJ at a repetition rate up to about 10 kHz, said at least one amplifier having a nearly diffraction limited spatial profile, wherein at least one of said at least one amplifiers comprises a cryogenically-cooled solid state amplifier; and a parametric amplifier receiving said signal conditioned pulses from said signal arm and said output pump pulses from said pump arm and producing amplified output pulses at said signal wavelength.

27. The pulsed light source according to claim 26, wherein said at least one signal conditioning stage comprises a pulse stretcher, said source further comprising: a pulse compressor receiving amplified output pulses from said parametric amplifier and compressing pulse widths of said amplified pulses to approximately the transform limit.

28. The pulsed light source according to claim 26, wherein said pump arm further comprises a chirped pulse amplification system configured to stretch pulses prior to amplifying with said at least one amplifier and configured to compress output optical pump pulses to a pulse width as short as about 1 ps.

29. The pulsed light source according to claim 26, wherein said at least one amplifier comprises a coherently combined fiber array.

* * * * *

UNITED STATES PATENT AND TRADEMARK OFFICE
CERTIFICATE OF CORRECTION

PATENT NO. : 8,023,538 B2
APPLICATION NO. : 12/411334
DATED : September 20, 2011
INVENTOR(S) : Marcinkevicius et al.

It is certified that error appears in the above-identified patent and that said Letters Patent is hereby corrected as shown below:

On Page 3, in column 2 at line 13, change "noncolinear" to --noncollinear--.

In column 4 at line 8, change "of" to --of:--.

In column 8 at line 31, change "chalocogenide" to --chalcogenide--.

In column 13 at line 57, after "system" insert --.--.

In column 14 at line 55, after "system" insert --.--.

In column 17 at approximately line 33, in Claim 12, change "RTA, RTA," to --RTA, KTA,--.

In column 18 at line 26, in Claim 24, change "RTA, RTA," to --RTA, KTA,--.

Signed and Sealed this
Twenty-sixth Day of June, 2012

David J. Kappos
*Director of the United States Patent and Trademark Office*